United States Patent [19]

Hershline

[11] Patent Number: 5,518,102

[45] Date of Patent: May 21, 1996

[54] DIVERTER

[75] Inventor: Bruce Hershline, Shelby Township, Mich.

[73] Assignee: Candid Logic Inc., Madison Heights, Mich.

[21] Appl. No.: 335,136

[22] Filed: Nov. 7, 1994

[51] Int. Cl.$^6$ .................................................. B65G 47/46
[52] U.S. Cl. ........................... 198/367; 198/457; 198/442; 209/657; 193/31 R
[58] Field of Search ........................ 198/367, 368, 198/457, 442, 530, 534; 193/31 R, 31 A; 209/657

[56] References Cited

U.S. PATENT DOCUMENTS

| 2,265,261 | 12/1941 | Bergmann | 198/367 X |
|---|---|---|---|
| 2,675,917 | 4/1954 | Powers | 206/111 |
| 3,052,351 | 9/1962 | Hanstein | 209/74 |
| 3,874,653 | 1/1975 | Welch et al. | 271/64 |
| 4,314,645 | 2/1982 | Perkins, III et al. | 209/638 |
| 4,813,205 | 3/1989 | Mikata et al. | 209/657 X |
| 5,279,426 | 1/1994 | Crismon et al. | 209/657 |
| 5,338,682 | 2/1995 | Dudley | 198/367 |

FOREIGN PATENT DOCUMENTS

| 271482 | 5/1964 | Australia | 209/657 |
|---|---|---|---|
| 58411 | 10/1967 | German Dem. Rep. | 209/657 |

*Primary Examiner*—D. Glenn Dayoan
*Attorney, Agent, or Firm*—Gifford, Krass, Groh, Sprinkle, Patmore, Anderson & Citkowski

[57] ABSTRACT

A diverter for redirecting a single member or portion of a generalized set of material passing thereby. The device includes an electromechanical actuator which moves from an extended to a retracted position. A flexible strip has a first end attached to actuator and a second end fixed with respect to the actuator. The device is positioned proximate a gravity slide down which a stream of material moves in a first direction. When the actuator moves from its extended to its retracted position, the resilient strip flexes out into the path of the moving material. Any of the material striking the flexible strip will be deflected into a second direction which diverges from the first direction.

7 Claims, 2 Drawing Sheets

DIVERTER

FIELD OF THE INVENTION

This invention relates to automated devices for directing the flow of passing material or discrete parts, and, more particularly to an electromechanically actuated device which diverts a single one of said parts or a portion of said material from the passing, generalized flow.

BACKGROUND OF THE INVENTION

There are a number of known prior art devices for sorting particular objects or parts having a particular, preselected characteristic from a generalized stream of parts or for diverting selected segments of a flowing stream of fluid or granular matter from the main body of flow. Both of these tasks can employ the same apparatus and will hereinafter be considered collectively. Typically, these automatic sorting machines divert the parts possessing the particular characteristic so that they travel along a secondary path divergent from the primary path along which the generalized stream of parts travels. Most typically, the devices operate to sort out defective (too large, too small, irregular, etc.) parts as part of general quality control operations. In many cases, known types of optical-electronic sensors are used to identify those parts having the characteristic. When a part is detected that has a flaw or other characteristic, a signal is sent a mechanical means downstream of the sensor. Actuation of the mechanical device causes the defective part to be diverted or rejected from the generalized stream of perfect parts.

Examples of such mechanical sorting devices include U.S. Pat. Nos. 2,675,917; 3,052,351; 3,874,653; 4,314,645; and 4,813,205. Such prior art devices rely on magnetism, pneumatics, gravity, mechanical separators, etc., to sort and separate the objects which may include documents, produce, manufactured parts, etc. For example, U.S. Pat. No. 4,314,645 discloses a system in which a deflector 24 is moved by a cylinder 26 from a first to a second position so as to redirect the path of falling items. The deflector is in the form of a pusher plate which is reciprocated back and forth upon the end of a piston rod which moves in and out of a compressed air actuated cylinder. Thus, when the piston is actuated, the pusher plate mechanically pushes the defective part out of the parts stream and into another direction. Another type of device is disclosed in U.S. Pat. No. 4,813,205 which includes a deflector 43 coupled to a cylinder 46. The deflector 43 is in the form of curved deflector plate mechanically coupled to a piston rod. The deflector plate selectively opens and closes a gravity chute so that objects may either pass therethrough or be deflected into another path of travel. In some cases, these patented devices can also be used or modified to divert a portion of a passing stream of non-fungible material such as grain.

Such prior art sorting devices suffer from a number of problems. Many of them are mechanically very complex and tend to be subject to frequent failure and breakdown. Others frequently jam and call for considerable operator vigilance, a highly undesirable trait in an automated system. Others are simply unreliable in function and do not reliably divert the identified part on a regular basis.

Accordingly, there is a need for a simple diverter device which is inexpensive and easy to manufacture, which is not subject to mechanical breakdown or jamming, and which reliably and repeatedly diverts selected portions or defective items from a generalized flow of material.

SUMMARY OF THE INVENTION

The present invention has been designed to overcome the deficiencies in the prior art noted above. It is a diverter which segregates and diverts from a generalized set of material passing in a first direction a particular portion or a single item thereof into a second direction. The device includes a resilient strip which has a first and second end. A first end of the strip is attached to an electromechanical actuator (such as a solenoid) which is capable of moving from a first, retracted position, to a second, extended position. The second end of the strip is fixed, such as by attachment to the housing of the electromechanical actuator. Hence, movement of the actuator from the first to the second position, and vice versa, will cause the resilient strip to successively flex and relax.

The diverter may be disposed proximate a gravity slide along which a generalized stream of material moves by gravity. Alternatively, the stream of material may be conveyed by a belt, discharged by a nozzle, or otherwise translated. The passing material may be fungible in nature (such as a stream of nominally identical parts) or it may be non-fungible (such as bulk grain). The diverter is positioned proximate the slide such that a longitudinal axis of the electromechanical actuator is disposed generally parallel to a first direction along which the stream of material travels across the slide by gravity. In the embodiment of the present invention where the actuator is a solenoid, the device is also positioned such that, when the solenoid plunger is in its extended position and the resilient strip is relaxed, the strip does not intrude into the passing stream of parts and they pass freely. However, the diverter of this embodiment is positioned close enough to the slide such that, when the plunger moves to its retracted position, the flexed resilient strip will intrude into the path of the stream of material. Hence, the next portion of material or discrete part to pass along the first direction path of travel will hit the flexed strip which will cause it to deflect into a second direction. Material deflected into the second direction can then be collected, as by means of a chute, hopper, etc.

Preferably, the electromechanical actuator further includes means for biasing it into its first, retracted position. Furthermore, actuation of the electromechanical actuator will cause it to move into its second, extended position. Thus, the biasing means will cause the actuator to return to the retracted position once the actuator signal to the actuator is interrupted. Hence, after a particular part or portion of material has been deflected off of the resilient strip into the second direction of travel by movement of the electromechanical actuator into its retracted, biased position, reactuation of the actuator will return it to its extended position, thus allowing the generalized stream of material again to pass undeflected.

In one preferred embodiment, the diverter of the present invention is incorporated into a system which includes the aforementioned gravity slide, as well as an electro-optical sensor disposed proximate the gravity slide upstream of the diverter. The sensor detects the existence of a preselected characteristic in a stream of nominally identical parts passing thereby. For example, the sensor may detect that one of the passing parts is too large. In that case, the sensor will generate an electric signal which is communicated to the electromechanical actuator to deactuate the plunger into the retracted position, and divert the defective part.

BRIEF DESCRIPTION OF THE DRAWINGS

The following detailed description is best understood by reference to the following drawings in which.

DETAILED DESCRIPTION OF THE PREFERRED EMBODIMENTS

Figure 1:
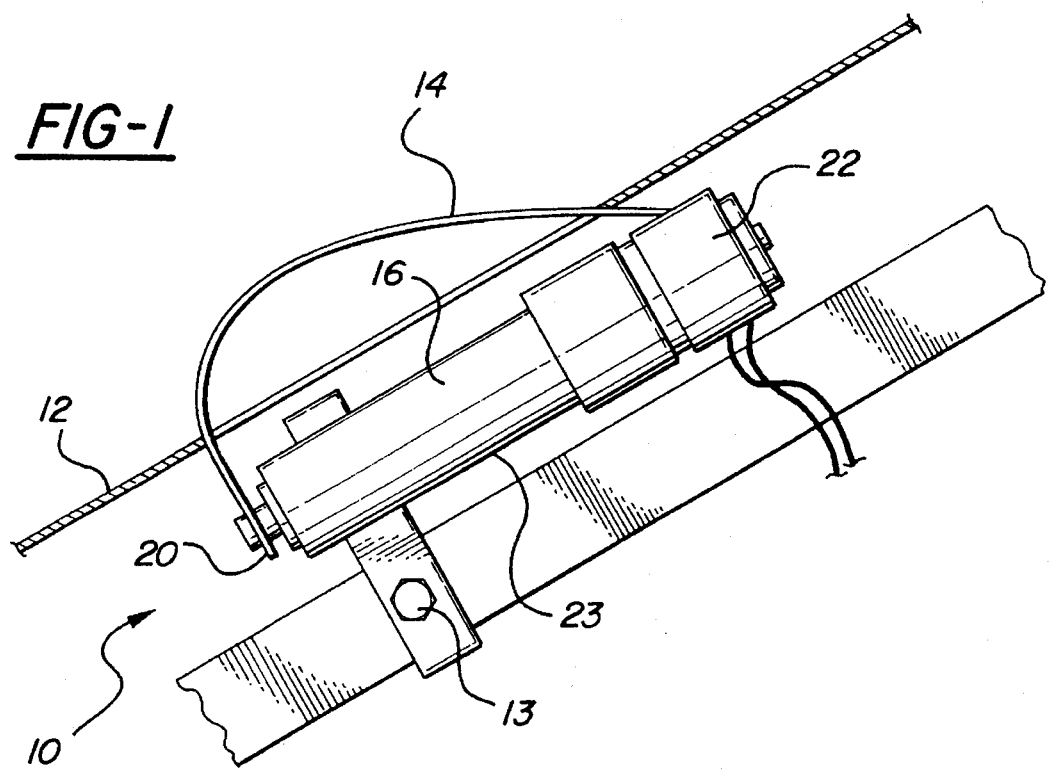
FIG. 1 is a perspective view of an embodiment of a diverter according to the present invention mounted proximate a gravity slide.

Throughout the following detailed description, like numerals are used to reference the same elements of the invention shown in multiple figures thereof. Referring now to the drawings, and in particular to FIG. 1, there is depicted a diverter 10 constructed according to the present invention. The diverter 10, which in this embodiment operates as a parts segregation device, is shown mounted proximate a gravity slide 12 by means of bolt 13. The diverter 10 includes a resilient strip 14 having first and second ends 20, 22. Resilient strip 14 is mounted onto an electromagnetic actuator in the form of a solenoid 16 such that the first end 20 of the strip 14 is attached to the solenoid's plunger 18 and second end 22 is fixed to solenoid housing 23. Thus, when the plunger 18 of the solenoid 16 is in its retracted position, the strip 14 will flex in the manner depicted in FIGS. 1 and 3. Conversely, when the plunger 18 moves to its extended position, the strip 14 will have the relaxed configuration shown in FIG. 2.

Figure 2:
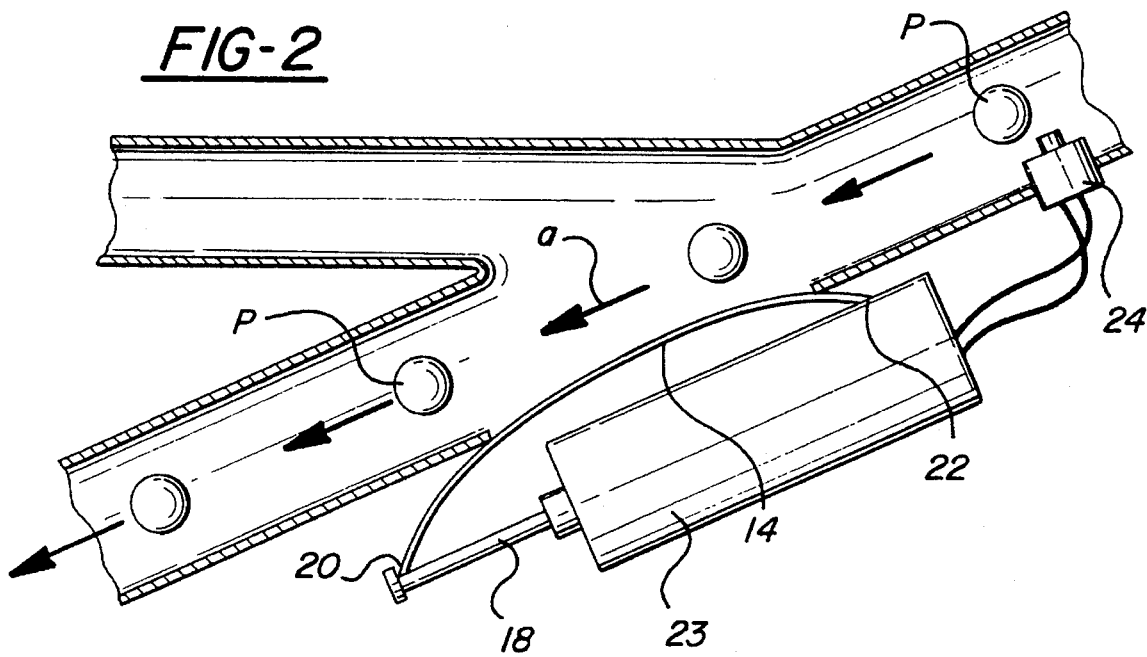
FIG. 2 is a schematic view of the present invention in operation and showing the plunger of an electromechanical actuator in its extended position.
Figure 3:
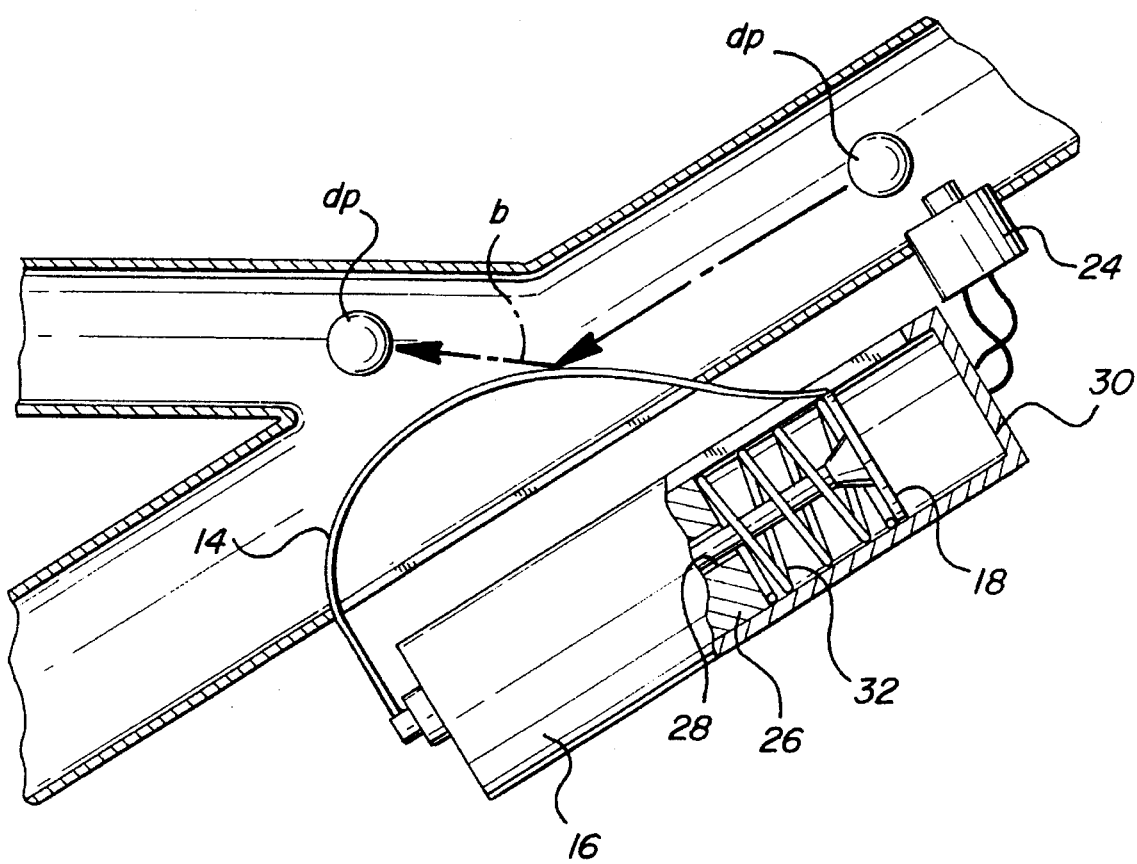
FIG. 3 is a schematic view similar to FIG. 2, but showing the plunger in its retracted position and partially cut away to show certain internal features thereof.

As can be seen by comparing FIGS. 2 and 3, when the plunger 18 is in its extended position, the relaxed strip will allow a stream of moving parts p to pass in a first direction a unimpeded. However, when the strip 14 is in its flexed condition because the plunger 18 has retracted, it will present a barrier to the stream of parts and a part passing by the device 10 will be deflected by the resilient strip 14 in a second direction b, as has happened in FIG. 3.

As can be seen from FIGS. 1-3, the diverter 10 is mounted proximate the gravity slide 12 such that the longitudinal axis of the solenoid 16 is substantially parallel to the first direction of travel a of the parts p moving down the slide 12. In FIGS. 2 and 3, an electrooptical sensor 24 is mounted upstream of the device 10 and is in electrical communication therewith to generate an actuating signal. The sensor 24, which may be any of a number of prior art devices, is capable of scanning the parts p optically as they pass thereby for the existence of a preselected characteristic. For example, one of the parts p may be too large. The sensor will optically sense this condition and interrupt the actuating signal normally communicated to the solenoid 16. This interruption will deactivate the solenoid 16 and cause the plunger 18 to move into its retracted position, thereby deflecting the defective part up along the second direction of travel b.

The solenoid 16 shown in FIG. 3 has been cut away to show certain internal features thereof. In particular, the solenoid includes a coil 26 disposed inside housing 23. The solenoid 16 further includes an armature 28, and a plunger 18 mounted for movement with a pole piece 30. The plunger 18 has a spring 32 associated therewith and disposed to bias the pole piece 30 and armature 28 apart. When the solenoid 16 is energized, the coil 16 creates a magnetic field which tends to draw the armature 28 and pole piece 30 together, thereby extending the plunger 18 out of the solenoid. This extension causes strip 14 to relax into the position shown in FIG. 2.

Of course, it would be possible to vary the diverter of the present invention by using a different style of electromechanical actuator, such as a solenoid which is biased into the extended position, and in which the plunger moves to the retracted position when the solenoid coils are activated. In that case, an activation signal would be fed to the solenoid upon detection of a flawed part. Furthermore, a number of other electromechanical devices could be used other than a solenoid provided they were capable of responding to an electronic signal by changing shape from a retracted to an extended position and back again.

The resiliency of the resilient strip 14 confers several advantages on the diverter of the present invention. For example, because the strip is resilient, it flexes when an object impacts it, thus resulting in low object impact intensity. This minimizes both wear of the diverter and wear or damage to the object and extends the useful life of the diverter. Moreover, the resilience of the strip causes a defective part which strikes it to rebound therefrom with increased energy, thereby helping to move the rejected part into the second direction of travel and maximize the magnitude of its diverted travel. Moreover, only a small amount of power is required to flex the strip, allowing the use of low energy actuators. Additionally, the relatively low mass of the resilient strip results in a low inertial load imposed on the actuator and allows high speed, sustained operation.

In fabricating the resilient strip of the present invention, a number of materials may be used, such as sheet metals including sheet steel and sheet aluminum, as well as any suitable sheet polymeric material which is both strong enough to function on a continuous basis, and resilient enough to flex with the movement of the actuator.

Thus, the present invention achieves the function of materials diversion in a reliable, inexpensive, and structurally simple manner. It is not prone to either jamming or mechanical breakdown and is reliable in operation. Of course, certain variations in the present design may occur to one skilled in the art having the benefit of the teachings of the present invention. However, such design variations are considered to be within the scope of the present invention. It is the claimed appended hereto, and all reasonable equivalents thereof, which define the scope of the invention rather than the particular embodiments and exemplifications depicted herein.

I claim:

1. A diverter for segregating and diverting a segment of a flow of material traveling in a first direction, said diverter comprising:

a slide across which a generalized set of material travels in a first direction; and a diverter member disposed proximate said slide and including:

a resilient strip having a first end and a second end; and an electromechanical actuator capable of movement between an extended and a retracted position and having a longitudinal axis generally parallel to said direction of said stream of parts, said first end of said resilient strip being coupled to a movable portion of said actuator and said second end being fixed with respect to said slide such that, when said actuator is in one of said positions, said material continues to pass undeflected in said first direction, and when said actuator changes to said other of said positions, said strip flexes and moves to resiliently deflect a portion of the flow of material passing thereby into a second direction to separate said passed material from said deflected material.

2. The device of claim 1 wherein said electromechanical actuator further comprises means for biasing said actuator into its retracted position.

3. The diverter of claim 1 wherein when said material constitutes a plurality of parts, said diverter further comprising a sensor in communication with said actuator for detecting the presence of a preselected characteristic in each of said parts and for generating an activating signal to move said actuator to said retracted position when said characteristic is detected in one of said plurality of parts.

4. The device of claim 3 wherein the preselected characteristic is a defect, and the device operates to segregate and divert defective parts from said plurality of parts.

5. The system of claim 1 wherein said actuator is a solenoid including a plunger, said first end of said resilient strip being coupled to said plunger.

6. A diverter for segregating and diverting from a generalized stream of material passing in a first direction a portion of said material into a second direction, said device comprising:
   a resilient strip having a first end and a second end; and
   an electromechanical actuator capable of movement between an extended and a retracted position, said actuator having a longitudinal axis generally parallel to said direction of said stream of material, said first end of said resilient strip being coupled to a moving portion of said actuator and said second end of said resilient strip being fixed with respect to said moving portion such that, when said actuator is in the extended position, said material continue to pass undeflected from in first direction, and when said actuator moves to said retracted position, said strip flexes and resiliently deflects a portion of said material passing thereby into a second direction to separate said passed material from said deflected portion thereof.

7. A part segregation system for segregating and diverting a group of preidentified parts from a generalized stream of parts traveling in a first direction, said device comprising:
   a slide across which a generalized stream of parts travels in a first direction; and
   a diverter disposed proximate said slide and including:
      a resilient strip having a first end and a second end; and
      an electromechanical actuator including a housing and a plunger extending therefrom which moves between an extended and a retracted position, said plunger having a longitudinal axis generally parallel to said direction of said stream of parts, said first end of said resilient strip being coupled to said plunger and said second end of said resilient strip being coupled to said actuator housing such that, when said plunger is in the extended position, said parts continue to pass undeflected in said first direction, and when said plunger moves to said retracted position, said strip flexes and resiliently deflects a part passing thereby into a second direction to separate said passed parts from said deflected part.

* * * * *